United States Patent
Martynov et al.

(10) Patent No.: US 10,204,712 B2
(45) Date of Patent: Feb. 12, 2019

(54) METHOD FOR INNER-CONTOUR PASSIVATION OF STEEL SURFACES OF NUCLEAR REACTOR

(71) Applicant: Joint Stock Company "AKME-Engineering", Moscow (RU)

(72) Inventors: Petr Nikiforovich Martynov, Obninsk (RU); Radomir Shamilievich Askhadullin, Obninsk (RU); Aleksey Nikolaevich Storozhenko, Obninsk (RU); Konstantin Dmitrievich Ivanov, Obninsk (RU); Aleksandr Urievich Legkikh, Obninsk (RU); Said Mirfaisovich Sharikpulov, Barvikha (RU); Aleksandr Ivanovich Filin, Moscow (RU); Sergey Viktorovich Bulavkin, Moscow (RU)

(73) Assignee: Joint Stock Company "AKME-Engineering", Moscow (RU)

( * ) Notice: Subject to any disclaimer, the term of this patent is extended or adjusted under 35 U.S.C. 154(b) by 426 days.

(21) Appl. No.: 15/102,350

(22) PCT Filed: Dec. 8, 2014

(86) PCT No.: PCT/RU2014/000915
§ 371 (c)(1),
(2) Date: Jun. 7, 2016

(87) PCT Pub. No.: WO2015/088389
PCT Pub. Date: Jun. 18, 2015

(65) Prior Publication Data
US 2017/0018319 A1    Jan. 19, 2017

(30) Foreign Application Priority Data
Dec. 10, 2013 (RU) ................ 2013154531

(51) Int. Cl.
| C23C 22/72 | (2006.01) |
| G21C 13/087 | (2006.01) |
| C23C 22/73 | (2006.01) |
| G21C 17/022 | (2006.01) |
| C23C 8/10 | (2006.01) |

(52) U.S. Cl.
CPC ............ *G21C 13/087* (2013.01); *C23C 22/73* (2013.01); *G21C 17/0225* (2013.01); *G21Y 2002/103* (2013.01); *G21Y 2004/20* (2013.01); *Y02E 30/40* (2013.01)

(58) Field of Classification Search
CPC . C23C 22/70; C23C 22/72–22/73; C23C 8/10
See application file for complete search history.

(56) References Cited

U.S. PATENT DOCUMENTS

| 4,636,266 A | 1/1987 | Asay |
| 6,488,783 B1 | 12/2002 | King et al. |

FOREIGN PATENT DOCUMENTS

| JP | 61199073 | 9/1986 |
| RU | 2066710 | 9/1996 |
| RU | 93013041 | 9/1996 |
| RU | 2100480 | 12/1997 |
| RU | 2182193 | 5/2002 |
| RU | 200130144 | 10/2002 |
| RU | 2195514 | 12/2002 |
| RU | 2286401 | 10/2006 |
| RU | 2456686 | 7/2012 |
| TW | 347407 | 12/2008 |

OTHER PUBLICATIONS

International Preliminary Report on Patentability dated Jun. 14, 2016.
Translation of Written Opinion of the International Searching Authority dated Mar. 12, 2015.
Written Opinion of the International Searching Authority dated Mar. 12, 2015.
Translation of International Search Report dated Mar. 26, 2015.
International Search Report dated Mar. 26, 2015.
English Abstract of RU 2195514.
English Abstract of TW 347407.
English Abstract of JP 61199073.
English Abstract of RU 93013041.

*Primary Examiner* — Lois L Zheng
(74) *Attorney, Agent, or Firm* — Preston Smirman; Smirman IP Law, PLLC

(57) ABSTRACT

A method for the inner-contour passivation of steel surfaces of a nuclear reactor consists in filling a first contour of a nuclear reactor with a liquid metal coolant, introducing a reagent into the liquid metal coolant, said reagent interacting with the material of elements of the first contour, forming a protective film, and heating the liquid metal coolant, having the reagent introduced therein, to a temperature allowing for conditions for forming the protective film. The liquid metal coolant having the reagent introduced therein is kept at said temperature until a continuous protective film is formed on the surface of the material of the elements of the first contour. The liquid metal coolant having reagent introduced therein is heated by means of the friction thereof against rotating vanes of a vane pump, which is submerged in the liquid metal coolant. The present invention thus provides for a simpler passivation process, a more reliable passivation mode, an increase in the safety thereof and a simpler control over the process of passivation of steel surfaces.

9 Claims, No Drawings

METHOD FOR INNER-CONTOUR PASSIVATION OF STEEL SURFACES OF NUCLEAR REACTOR

CROSS-REFERENCE TO RELATED APPLICATION

The instant application is a national phase of PCT International Application No. PCT/RU2014/000915 filed Dec. 8, 2014, and claims priority to Russian Patent Application Serial No. 2013154531, filed Dec. 10, 2013, the entire specifications of both of which are expressly incorporated herein by reference.

The invention relates to nuclear power industry, and more particularly to methods for protection of steel surfaces of a fast reactor with a liquid metal coolant by means of their inner-contour passivation.

During operation of fast reactors with a liquid metal coolant, internal surfaces of the first contour are subject to dynamic corrosion increasing as a result of coolant circulation between contour sections running at different temperatures. In the high-temperature contour section, the liquid metal coolant dissolves components of the alloy used in the contour walls and transports the dissolved metals around the contour. In the cold contour section, components of the solution deposit, thus infringing the heat exchange conditions and forming plugs blocking the coolant channels. To prevent corrosion of the internal surfaces of the reactor first contour contacting with the heavy liquid metal coolant, they are subject to passivation by forming on the surfaces of oxide films having suitable thickness, continuity, composition and strength.

Now, there are various ways to passivate steel surfaces of a nuclear reactor.

A method is known for passivation of surfaces of nuclear reactor stainless steel pipelines to retard buildup of radioactive materials on such workpiece surface portion (see U.S. Pat. No. 4,636,266, IPC C23C08/10, C23C08/14, published on Jan. 13, 1987). According to this method, a pre-polished surface of pipes is exposed to a gaseous oxygen source, such as air containing a small amount of water vapor, at a temperature from 150 to 450° C. (preferably, 250 to 350° C.) for at least five hours. The method is used for pre-treatment of pipe surfaces prior to their installation into a nuclear reactor.

A method is known for passivation of high-temperature austenitic alloys (see U.S. Pat. No. 6,488,783, IPC C23C8/02 C23C8/10, C23C8/16, W published on Dec. 3, 2002) by forming a chromium oxide film on a surface of a nickel-based alloy workpiece containing chromium. The method includes heating the workpiece to a temperature sufficient to oxidize the chromium (about 1100° C.) and exposing the surface of the workpiece at the said temperature to a mixture of water vapor and inert gas for 3-5 minutes. The content of water vapor in the mixture ranges from 0.08% to 40 m %. Hydrogen, argon, helium or their mixtures are used as an inert gas. Workpieces with surfaces treated using this method are used in the first contour of water-cooled reactors. The method requires application of high temperatures to heat workpieces and rather expensive gases.

A method is known for passivation of power-generating equipment made of pearlitic steel (see Patent RU2195514, IPC C23C22/00, C23F11/00, published on Dec. 27, 2002) by forming an oxide coating on the surface using chemical solutions containing hydrazine. The treatment is performed with a solution containing between 0.01 and 0.03 g/l of hydrazine with an addition of nitric acid up to 3.0-4.5 pH for 1-5 hours at a temperature from 80 to 100° C.

A method is known for passivation and cleaning of steel pipes (see Application RU2000130144, IPC C23G5/00, C23F11/02, F28G13/00, published on Dec. 27, 2002), wherein the inner pipe surface is exposed to oxygen-containing agent, such as air with an addition of oxygen or nitrogen with a concentration up to 1.2 g/l. The treatment is performed for 0.5-50 minutes at an agent flow rate from 50 to 200 m/s and at a temperature from 300 to 500° C. The method is intended for the preliminary inner-contour passivation of surfaces of steel pipes.

A method is known for non-waste passivation and temporary shutdown of power-generating equipment made of pearlitic steel (see Patent RU2182193, IPC C23F11/02, published on May 10, 2002). The method consists in forming an oxide coating on the surfaces by exposing them to nitrite ammonium in water or vapor at a temperature from 95 to 140° C. for 1.5-3 hours and with a concentration from 60 to 150 mg/kg. The method allows to improve the efficiency of the equipment corrosion protection and to eliminate waste generation, as the nitrite ammonium decomposes into nitrogen and water when the power plant is transferred to power operation. However, the method is limited in application as it is intended for processing pipelines of water-cooled nuclear reactors.

A method is known for passivation of carbon steel pipelines of a nuclear reactor (see Patent TWM347407, IPC C23C16/44, published on Dec. 21, 2008), wherein the inner surface of the first contour piping at a nuclear power plant is exposed to water with a high concentration of dissolved oxygen and pH setpoint. The passivation method is used in the testing period prior to operation, during start-up or maintenance/repair and shutdown of a nuclear reactor. It should be noted that the known method is designed for passivation of water-cooled nuclear reactor carbon steel pipelines. Moreover, implementation of this method requires additional equipment, such as filter/demineralized water generator, reagent storage and supply tank, the said reagent supporting the pH setpoint, treated reactor water pump, and electrochemical monitor.

A method is known for passivation of nuclear reactor pipeline surfaces (see Application JPS61199073, IPC C23C22/68; C23F14/00; C23F14/02, published on Mar. 9, 1986). The first contour is filled with water, then water is heated by a heater to a temperature above that of pipeline passivation, and its pressure is increased above the steam generation pressure, the first contour pump is used for heated water circulation in the first contour to form a passivating film on a pipeline surface. The method is limited in application. It is not suitable for passivation of steel elements of a nuclear plant with a liquid metal coolant as the temperature conditions and materials used in the design of these reactors are fundamentally different.

A method is known for protection of structural materials against corrosion in lead, bismuth, and their alloys (see Application RU93013041, IPC C23F11/00 published on Jun. 27, 1995). The method includes forming a protective oxide film based on Me3O4 spinel, 1-50 microns in thickness, by exposing the material to a liquid metal fluid with a low partial pressure of $P_{O2} \sim 10^{-17}$ atm. for example, Pb(Bi)-O and their alloys with a thermodynamic oxygen activity in the solution at a level of $\alpha_{O2}=1-10^{-4}$ and at a temperature from 330 to 800° C. for 1-100 hours. There is no description of liquid metal fluid heating facilities in the published application information.

As evidenced by practice, pretreatment of steel surfaces of the first contour of a fast nuclear reactor with a heavy liquid metal coolant cannot guarantee a sufficient level of passivation minimizing oxidation processes on the surfaces in case of interaction of the surfaces of the first contour with the liquid metal coolant (for example, lead, lead-bismuth eutectic). In view of the above, in addition to the factory (external) passivation, provision is usually made for inner-contour passivation of steel surfaces performed during initial operation of nuclear reactors for fast nuclear reactors. To implement passivation of steel elements of the "fresh" core in a liquid metal coolant, it is necessary to raise the temperature of the liquid metal coolant to a higher value compared to that prior to the loading of the "fresh" core in the reactor within an acceptable time. To raise the liquid metal coolant temperature required to create passivation conditions, external heaters are usually used or a reactor plant is transferred to a required power level. However, external heaters are difficult to use, because their use is associated with the necessity of using a rather complicated and expensive heating system, which results in substantial additional capital investment. Reactor plant transfer to a required power level may be used to increase the temperature of the coolant for further passivation. However, the first contour elements in contact with a heavy liquid metal coolant are usually made of different steel grades: often lower oxygen activity is required for forming quality protective oxide films on fuel claddings, higher activity for other surfaces.

A method of inner-contour passivation of steel surfaces of nuclear reactor is known (see Patent RU2456686, IPC G21C1/03, published on Jul. 20, 2012). It coincides with the present technical solution in most essential features and is taken as a prototype.

The prototype method includes the filling of the first contour of a nuclear reactor with a liquid metal coolant, introduction of a reagent in the liquid metal coolant interacting with the first contour element material to form a protective film, heating of the liquid metal coolant to a temperature that ensures conditions of formation of the protective film with an introduction to this reagent, and delaying at this temperature of the liquid metal coolant, with the reagent introduced until a solid protective film forms on the first contour element material. Carbon is used as the reagent interacting with the material of the first contour elements. Its atomic fraction in lead is between $10^{-5}$ and $10^{-4}$ at the operating temperature of the liquid metal coolant. The heating of the liquid metal coolant to the required temperature for passivation is performed through nuclear reactor transfer to the desired power level.

The need to transfer a nuclear reactor to the desired power level for passivation in the prototype method complicates the implementation of passivation conditions, reduces its safety and complicates control of the process of passivation of steel surfaces, since the transfer to power operation is associated with nuclear hazardous work. Additionally, it is an expensive procedure since it requires operation of the entire reactor plant, while the work conditions are non-optimal. Moreover, this method is limited in application as it involves the use of fuel elements comprising not only a leak-tight housing, but also a protective cladding made of vanadium or niobium or an alloy based on vanadium and/or niobium, and lead is used as a coolant. A carbide film is created mainly on the FE protective cladding surface, wherein passivation of the other elements of the nuclear reactor first contour (pumps, steam generators surfaces, etc.) appears less intensive (the description does not specify if the material of such elements contains vanadium, niobium or an alloy based on the same).

The task of this invention is to develop a method for inner-contour passivation of steel surfaces of a nuclear reactor that would provide simplification of the passivation process, more robust passivation conditions, increase its safety and simplify the control of steel surface passivation process.

The task is solved as the method for inner-contour passivation of steel surfaces of a nuclear reactor consists in filling the first contour of a nuclear reactor with a liquid metal coolant; introducing a reagent into the liquid metal coolant, said reagent interacting with the material of elements of the first contour forming a protective film; heating the liquid metal coolant, having the reagent introduced therein, to a temperature allowing for conditions for forming a protective film. The liquid metal coolant having the reagent introduced therein is kept at the said temperature until a continuous protective film is formed on the surface of the material of the elements of the first contour. The new element in the method is heating of the liquid metal coolant with the reagent introduced therein by means of the friction thereof against rotating vanes of a vane pump which is submerged in the liquid metal coolant with the reagent. During the rotation of pump vanes, a part of their energy dissipates in the liquid metal coolant W due to the friction, thus increasing its temperature.

The passivation mode is simplified by the use of standard systems of the reactor plant. It is not necessary to transfer the reactor plant to a desired power level. Separate passivation of the first contour and fuel rods is simplified (first passivation of the first contour without the core (with its simulator) is performed, and then the core is passivated).

The main circulation pump of the first contour may be used as a vane pump submerged in the liquid metal coolant.

When the liquid metal coolant with the reagent introduced therein is heated, heat removal from the first contour may be limited by shutdown of one or all heat exchangers.

Preliminary (e.g. external, factory) passivation of the first contour elements of a nuclear reactor may be performed.

To suppress corrosion of the first contour walls that are usually made of chromium steel, a reagent may be introduced into the coolant (lead-bismuth alloy) in a form of oxygen for the purpose of passivation of the surface layer of the walls by forming a solid $FeO$—$(Cr, Fe)_2O_3$ spinel film.

The liquid metal coolant in form of such lead-bismuth alloy with oxygen introduced therein is preferably held at a temperature from 370 to 500° C. for 2-10 days, while the thermodynamic oxygen activity in the liquid metal coolant may be maintained at $5 \cdot 10^{-6}$-$5 \cdot 10^{-5}$.

The method of inner-contour passivation of nuclear reactor steel surfaces is performed as follows. The first contour of a nuclear reactor is filled with a liquid metal coolant, for instance, a lead-bismuth alloy. A reagent is introduced in the liquid metal coolant. The reagent interacts with the first contour element material, a protective film is formed, for example, oxygen. The thermodynamic oxygen activity in the liquid metal coolant may be maintained at $5 \cdot 10^{-6}$-$5 \cdot 10^{-5}$. The liquid metal coolant with the reagent introduced therein is heated to a preferred temperature from 370 to 500° C. by rotation of vanes of a vane pump (for instance, the main circulation pump) submerged in the liquid metal coolant. The liquid metal coolant with the reagent introduced therein is held at this temperature for 2-10 days until a solid protective film is formed on the surface of the first contour element material.

Preliminary (e.g. external, factory) passivation of the first contour elements, such as the core and steam generators, may be performed. Preliminary passivation allows to reduce the intensity of oxygen consumption by about 50% during normal operation, wherein passivation of steam generators yields the maximum effect (~30%) due to the fact they have a large surface area in contact with the liquid metal coolant. A significant advantage of the claimed method is that thin continuous and durable (corrosion) protection oxide films are formed when the above conditions are met.

To substantiate this method of inner-contour passivation of steel surfaces of a nuclear reactor, a significant number of experimental studies were conducted. In particular, with regard to the essential components of the first contour, fuel elements (steel EP-823), it was demonstrated that oxidation (surface passivation) in the melt provides reliable corrosion protection of the whole steel surface at higher temperatures (t=620-650° C.) on the basis of 1000 to 5000 hours with good statistics (tens of campaigns). The latter circumstance is essential as pitting corrosion spots were detected from time to time with a statistical dispersion on witness specimens without protection of any kind, including oxidation, during the very tests. The present method for inner-contour passivation of steel surfaces of a nuclear reactor has been experimentally verified with passivation of structural elements of the first contour of the lead-bismuth fast reactor having the same electrical capacity of 100 MW (SVBR-100). The liquid metal coolant was heated by means of a main circulation pump for 700 kW with a heat loss of 51 kW. According to the results of experimental testing, corrosion resistance is ensured for steel elements of the first contour, provided that the said elements were not subject to any prior specific preparation for operation in the heavy liquid metal coolant.

The invention claimed is:

1. A method for inner-contour passivation of steel surfaces of a nuclear reactor, comprising the steps of:
    filling a contour of the nuclear reactor with a liquid metal coolant;
    introducing a reagent into the liquid metal coolant;
    wherein the reagent interacts with a material of the contour so as to form a protective film;
    heating the liquid metal coolant, having the reagent introduced therein, to a temperature allowing for conditions for forming the protective film;
    wherein the liquid metal coolant, having the reagent introduced therein, is kept at the temperature until a continuous protective film is formed on the surface of the material of the contour;
    wherein the liquid metal coolant, having the reagent introduced therein, is heated by means of friction thereof against rotating vanes of a vane pump, which is submerged in the liquid metal coolant.

2. The method according to claim 1, wherein a primary coolant pump is used as the vane pump immersed in the liquid metal coolant.

3. The method according to claim 1, wherein heat removal from the contour is limited by shutdown of at least one heat exchanger when heating the liquid metal coolant having oxygen introduced therein.

4. The method according to claim 1, wherein preliminary external passivation of the contour of the nuclear reactor is carried out.

5. The method according to claim 1, wherein a lead-bismuth alloy is used as the liquid metal coolant.

6. The method according to claim 5, wherein oxygen is introduced as a reagent.

7. The method according to claim 6, wherein the liquid metal coolant, having oxygen introduced therein, is held at a temperature from 370 to 500° C.

8. The method according to claim 6, wherein the liquid metal coolant, having oxygen introduced therein, is held for 2-10 days.

9. The method according to claim 6, wherein an oxygen thermodynamic activity in the liquid metal coolant is maintained at $5 \cdot 10^{-6} - 5 \cdot 10^{-5}$.

* * * * *